Patented Dec. 15, 1936

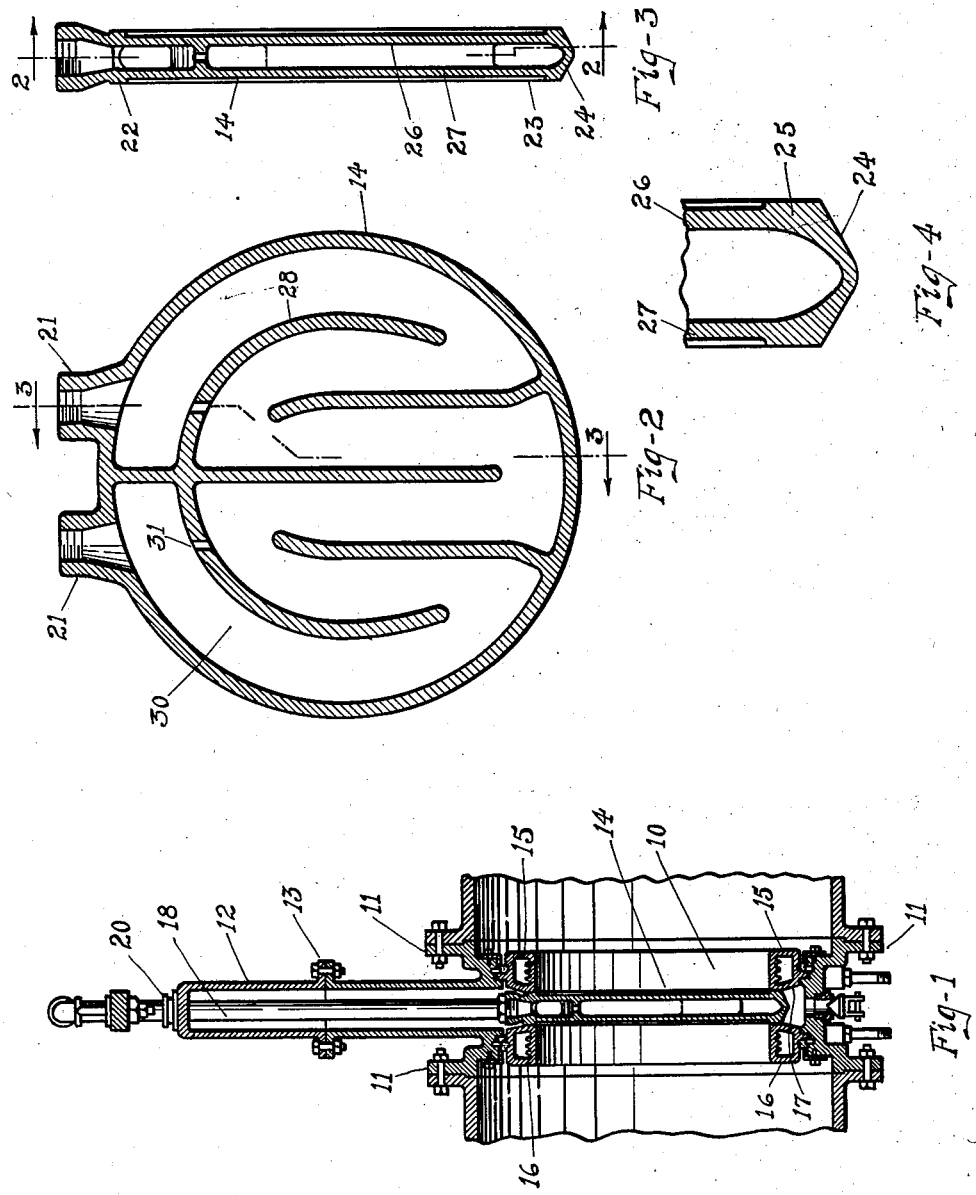

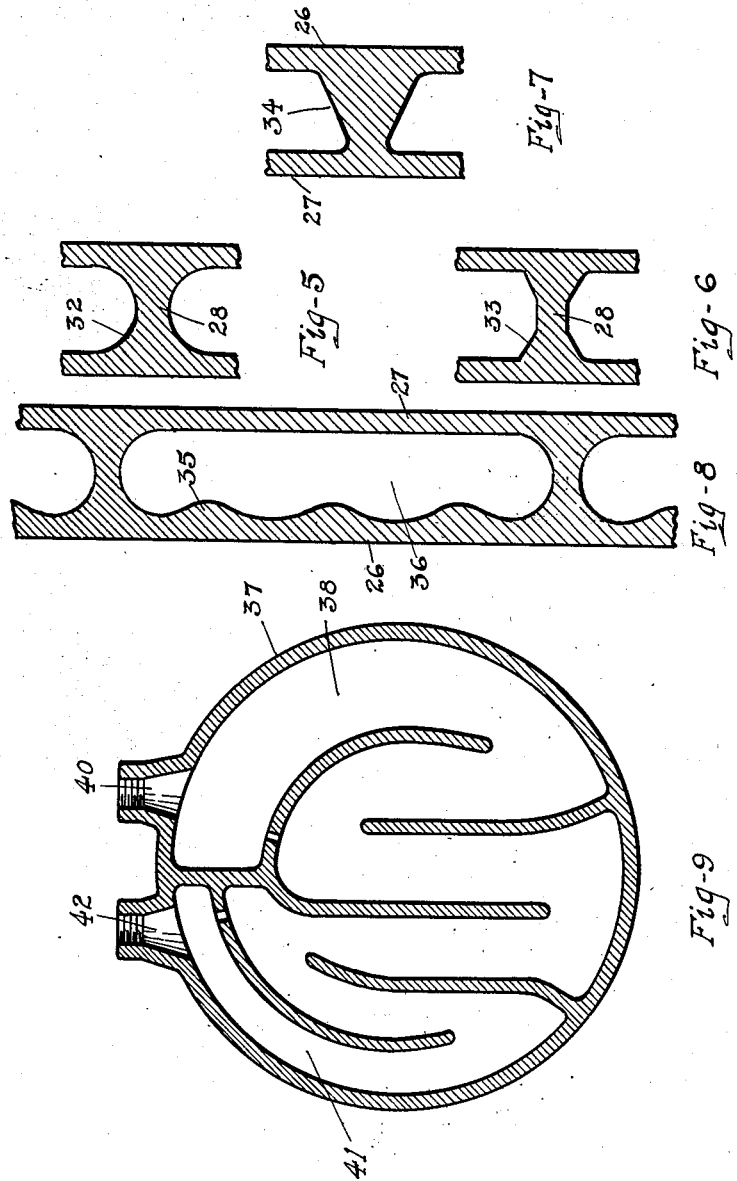

2,064,201

UNITED STATES PATENT OFFICE 2,064,201

HOT BLAST VALVE

Gordon Fox, Chicago, Ill., assignor to Freyn Engineering Company, Chicago, Ill., a corporation of Maine Application September 14, 1934, Serial No. 743,943

8 Claims. (Cl. 251—159)

The invention relates to hot blast valves of the gate type and has reference more particularly to valves designed for use in gas and air conduits especially the water cooled type disclosed in the patent to Mathesius No. 1,228,463 dated January 5, 1917, and which is used extensively in hot blast mains of metallurgical furnaces.

Valves of the character described soon develop structural defects when used in connection with hot blast stoves of blast furnaces, necessitating the removal of the entire valve and replacement of the faulty member. The principal faults that have been evident in these valves as constructed in the past are failure of the copper castings of both the valve seat and the valve member, due to the formation of cracks, air leakage between the member and the seats, and leakage between some of the joints of the steel housing. An analysis of the valve during operation will disclose the fact that the walls of the valve seats are subjected to different temperatures and also that one wall of the valve member when in closed position is in direct contact with and exposed to radiation from gases at a higher temperature than the gases on the opposite side of the member. Apparently, failure of the copper casting occurs because of stresses imposed by tendencies to distortion which are the result of the temperature differences in the walls of the castings. This distortion may also explain the air leakage which eventually develops between the valve seats and member.

In investigations and experiments in connection with a water cooled valve member used with gate valves of the type mentioned it was found that with the member in closed position the difference in the temperature of the side walls developed severe stresses in the peripheral ring connecting said walls and also in the reinforcing ribs joining the walls. It is evident that in addition to simple shear, compression and tension stresses, certain beam effects result, producing serious stresses in the walls in the area between the ribs and the localizing of stresses at those points where the side walls join with the connecting ring.

The invention proposes to overcome the above defects in the construction of the valve member and has for an object to provide a member of improved structural design, which will minimize the temperature differences existing in the side walls and between the side walls and connecting ring during use, and materially reduce the resulting stresses to prolong the life of the member.

Another object is to provide an improved construction of valve member for gate valves such as described which will operate satisfactorily over a long period of time, which will not develop cracks even under the most severe conditions, and which will utilize the flow of cooling water to secure the greatest cooling effect.

Another object is to improve the construction of a valve head by providing reinforcing ribs of ample cross section to enable these ribs to serve as heat-dissipating elements, by arranging said ribs to insure rapid flow of the cooling medium for the entire area of the valve, and by increasing the section of metal joining the ribs to the side walls, thereby facilitating the transfer of heat from the face of the side walls into the ribs and from side wall to side wall and the dissipation of heat to the cooling medium.

With these and various other objects in view, the invention may consist of certain novel features of construction and operation, as will be more fully described and particularly pointed out in the specification, drawings and claims appended hereto.

In the drawings which illustrate an embodiment of the invention and wherein like reference characters are used to designate like parts—

Figure 1 is a sectional view taken through a gate valve having a valve head constructed in accordance with the invention;

Figure 2 is a sectional view of the valve head showing the construction and arrangement of the reinforcing ribs;

Figure 3 is a transverse sectional view through the valve taken substantially along the line 3—3 of Figure 2;

Figure 4 is a detail sectional view showing the distribution of metal in the connecting ring joining the walls of the valve;

Figure 5 is a detail sectional view showing a construction of reinforcing rib;

Figure 6 is a detail sectional view showing another modification of reinforcing rib;

Figure 7 is a detail sectional view showing a further modified construction of reinforcing rib;

Figure 8 is a transverse sectional view of part of a valve head showing a feature in the construction of the side walls; and Figure 9 is a sectional view longitudinally of the valve head showing an arrangement of reinforcing ribs for increasing the velocity of the cooling water from inlet to outlet.

Referring to Figure 1 the valve casing comprises a body portion formed by the integral housing 10 having the vertical flanges 11 for securing the valve body to the hot blast main and a top portion 12 secured in any well known manner as at 13 to the body. A circular hollow valve member or head 14 is located within the valve body and positioned between annular valve seats 15 and 16 which have their inwardly directed faces tapered at 17 to provide a seat for the valve 14. The valve stem for supporting the valve 14 comprises pipes 18 extending through the top of the casing 12, being guided by the glands 20 and connecting with bosses 21 provided on the valve member. By employing pipes as valve stems provision is made for an inlet and outlet through which cooling water is delivered and discharged from the interior of the valve. The thickness of the valve is slightly less than the distance between the faces of the valve seats to permit limited swinging movement which is increased by the taper given the valve as the same is preferably constructed so that portion 22, Figure 3, adjacent the bosses 21 has a thickness slightly in excess of the end 23 of the valve. Valves of this type rely for their closing on the pressure of the gas against the valve member. The taper of the sides of member 14 is such that when the same is swung against either valve seat 15 or 16 a perfect and complete seal between the parts will result.

The invention particularly concerns the construction of the valve member which has been improved to eliminate the structural defects instrumental in developing cracks in the casting. Considering first the periphery of the member, the metal in the connecting ring 24 has been distributed to form portions 25 of increased thickness at those points where the ring joins with the side walls 26 and 27 of the valve member. It will be recalled that when the valve member is closed the respective side walls are subjected to gases at different temperatures and also to radiant heat resulting in great relative expansion of said side walls which tends to localize stresses in the connecting ring where the same joins with the side walls. Accordingly, the connecting ring is increased in thickness at 25 to reinforce these points of maximum stress. With the valve member in closed position the connecting ring is shielded and protected from radiation of heat from the walls of the flue, as will be understood from an inspection of Figure 1. For this reason the connecting ring tends to be much cooler than the side walls and expands to a lesser degree than the side walls, causing the stresses in the areas 25. The invention effectively reinforces the connecting ring to strengthen those points where failure will occur. This large section of metal where the walls 26 and 27 join with the ring also aids heat flow from the side walls to the connecting ring to equalize the temperature differences in the side walls and connecting ring. The result is to materially reduce the stresses in areas 25 and to lessen the danger of failure of the valve. Also the interior of the ring 24 is arcuate to eliminate sharp corners which tend to concentrate the stresses.

Also the valve member in accordance with the invention is considerably reduced in width and the reinforcing ribs 28 are increased in number and modified in function by increasing their thickess. As the paths for conducting heat from the wall of high temperature to the opposite wall of lower temperature are thereby shortened and are of larger cross section, the resistance to heat flow is minimized. This tends to equalize the temperature of the two side walls or faces and to reduce the stresses tending to warp and distort the valve causing the fractures. Also the reinforcing ribs are arranged to form a circuitous path 30 from inlet to outlet, traversing the entire area of the interior of the valve. The width of said circuitous path is selected so that the cooling water may have a uniform and fairly high velocity to secure the greatest cooling effect from said water. Openings 31 are located in certain of the ribs 28, as shown in Figure 2, to permit the escape of air, thus preventing the water passage from becoming air bound.

The thickness of the side walls in the present structure is the same as that in valves heretofore manufactured but the thickness of the present valve is reduced so that the same does not exceed seven times the thickness of a side wall. This ratio or possibly a lower ratio, say one-sixth, is considered preferable as the transfer of heat from wall to wall is aided by the reduction in width, although the valve is not too narrow for practical purposes. A valve of narrow width increases the cooling effectiveness of the water by increasing the water velocity and by making thinner streams so that all of the water is utilized and to the best advantage for taking up heat from the metal surfaces.

Figure 5 is a detail sectional view showing a construction of reinforcing rib which illustrates the thickness of said rib in proportion to that of the side walls of said valve. In this modification large fillets 32 join the interior surface of the side walls with the reinforcing rib, giving an arcuate contour to the confines of the water channel. As a result the heat flow from the side walls into and through the ribs is facilitated since the area of each side wall leading to the reinforcing ribs is increased. This area in accordance with the invention should equal approximately one-twelfth or more of the entire area of the side wall of the valve and in the modification of Figure 5 will probably equal about one-eighth of said area.

In the modification of Figure 6 the reinforcing ribs 28 are joined to the side walls of the valve by tapering portions 33 which likewise increase the area of metal leading from the side walls to the ribs and in this modification said area is approximately one-eighth of that of the entire side wall. The heat from the side wall subjected to the hot gases flows from these areas into the reinforcing ribs and to the opposite side wall, except for that which is dissipated from the surfaces of the reinforcing ribs directly to the cooling medium. With respect to both modifications shown in Figures 5 and 6 the average thickness of a reinforcing rib is preferably at least one and one-half times that of a side wall.

Still another modification of the reinforcing rib is shown in Figure 7. It may be assumed that the side wall 26 is in direct contact with and exposed to radiation from the hot gases and that wall 27 is exposed to gases at a considerably lower temperature. To aid in the transfer of heat from high temperature wall 26 to the opposite wall the reinforcing ribs have their maximum width where they join with the inside surface of wall 26 and taper to their smallest width where they join with wall 27. Thus the heat from wall 26 will readily flow into the reinforcing ribs 34 and from the ribs to the cooling water and to the lower temperature wall 27. The construction of the reinforcing ribs is such as to retard heat flow in the opposite direction, that is, from wall 27 to the ribs, so that the temperatures of the side walls become more nearly uniform. Also in this modification the average thickness of the reinforcing rib is at least one and one-half times that of a side wall.

Another construction for minimizing the difference in the temperature of the side walls of the valve head is shown in Figure 8 in which the side wall 26, having direct contact with the hot gases, is provided on its inner surface with spaced protuberances 35 which run lengthwise of the water channel 36. The wavy outline given to the inner surface of the wall increases the surface area exposed to the cooling water flowing through the channel 36 and accordingly more heat from the wall is dissipated to the cooling water. The interior surface of wall 27 is the usual plain construction, so that the proportion of heat given to the cooling water by this wall is much less than that given up by wall 26. The construction serves to reduce the temperature in the wall subjected to the hottest gases and therefore the walls more nearly approach each other in temperature.

The temperature of the side walls when absorbing a given quantity of heat is determined by the temperature difference necessary between side wall metal and cooling water in order to transfer said quantity of heat to the cooling medium. The higher the temperature of the cooling water the higher must be the actual temperature of the side wall. Since the outgoing water may be substantially warmer than the ingoing water the tendency is for the side walls near the outlet port to attain a higher temperature than the side walls near the inlet port. Figure 9 shows a valve head 37 similar in construction to the valve head shown in Figure 2 with the exception of a modified arrangement of the reinforcing ribs to provide a circuitous path for the cooling water of progressively diminishing cross sectional area from inlet to outlet to equalize the temperature of the valve throughout. The reinforcing ribs may have a construction such as shown in Figures 5, 6 and 7, since the modification resides in the arrangement of the ribs with respect to each other and to the interior surface of the connecting ring. The portion 38 of the water channel communicating with the cooling water inlet 40 has a width which is the maximum for the particular valve and the water flows through the same at its lowest velocity. The channel gradually becomes smaller in cross sectional area since each portion formed by the various sets of reinforcing ribs is of reduced width, until the end of the channel is reached where the reinforcing ribs are closest together. Accordingly portion 41 of the channel has the minimum cross sectional area and the water flows at the highest velocity to the outlet 42.

The velocity of the cooling water is an element affecting heat transfer, the higher the velocity of flow, the greater the heat transfer per degree of temperature difference between copper wall and cooling water. By causing the velocity of flow to increase as the water approaches the outlet the temperature difference between wall and water can be decreased and the wall temperature can be made approximately constant in the face of increasing temperature of cooling water.

It is to be understood that I do not wish to be limited by the exact embodiment of the device shown which is merely by way of illustration and not limitation, as various and other forms of the device will of course be apparent to those skilled in the art without departing from the spirit of the invention or the scope of the claims.

I claim:

1. In a gate valve, in combination, a valve casing, a hollow disc valve for location between spaced seat members, means for supplying said valve with a cooling fluid and a plurality of reinforcing ribs interior of the valve, said reinforcing ribs defining a circuitous path of progressively diminishing cross section from the inlet to the outlet.

2. In a gate valve, in combination, a valve casing, a hollow disc valve for location between spaced seat members, means for supplying said valve with a cooling fluid and a plurality of reinforcing ribs interior of the valve, said reinforcing ribs defining a circuitous path for conducting a cooling fluid through the interior of the valve, and said ribs being arranged with respect to each other and to the annular wall of the valve to cause the cooling fluid to gradually increase in velocity from inlet to outlet and to have its greatest velocity near the outlet.

3. In a gate valve, in combination, a valve casing, a hollow disc valve for location between spaced seat members, means for supplying said valve with a cooling fluid, and a plurality of reinforcing ribs of ample cross section interior of the valve, said ribs having an average thickness of at least one and one-half times that of a side wall, and said ribs being arranged to define a channel of progressively diminishing cross section from inlet to outlet for conducting said cooling fluid through the valve.

4. In a gate valve, in combination, a valve casing, a hollow disc valve for location between spaced seat members, said valve including side walls, a connecting ring joined to said walls by sections of increased thickness, and a plurality of ribs of ample cross section interior of the valve connecting the side walls, said ribs having an average thickness at least one and one-half times that of a side wall and said ribs being arranged to define a channel for conducting a cooling fluid through the valve and to cause said fluid to gradually increase in velocity from inlet to outlet with its greatest velocity occurring near the outlet.

5. In a gate valve, in combination, a valve casing, a hollow disc valve for location between spaced seat members, said valve including side walls and a plurality of reinforcing ribs connecting said walls and being located interior of the valve, said ribs being joined to at least one side by portions of increasing thickness whereby the flow of the heat from the side wall to the ribs is facilitated as the area of said side wall leading to the ribs is increased, said area being approximately from one-twelfth to one-eighth of the entire area of said side wall, and said ribs defining a channel for conducting a cooling fluid through the valve, said channel progressively diminishing in cross section from the inlet to the outlet.

6. In a gate valve, in combination, a valve casing, a hollow disc valve for location between spaced seat members, said valve including side walls, a peripheral connecting ring joined to each wall by a section of increased thickness with respect to the wall, and a plurality of ribs interior of the valve also connecting the side walls, said ribs defining a channel for conducting a cooling fluid through the valve, said channel progressively diminishing in cross section from inlet to outlet whereby the cooling fluid flowing through the valve gradually increases in velocity from inlet to outlet.

7. In a gate valve, the combination with a valve casing, of a hollow disc valve for location between spaced seat members, said valve including side walls, a peripheral connecting ring joined to each wall by a section of increased thickness with respect to the wall, a plurality of ribs interior of the valve also connecting the side walls, said ribs defining a channel of progressively diminishing cross section for conducting a cooling fluid from an inlet to an outlet whereby the cooling fluid flowing through the valve gradually increases in velocity from inlet to outlet, and protuberances on the interior surface of at least one side wall between the ribs for increasing the area exposed to the cooling fluid by said wall.

8. In a gate valve, the combination with a valve casing, of a hollow disc valve for location between spaced seat members, said valve including side walls, a peripheral connecting ring joined to each wall by a section of increased thickness with respect to the wall, the interior surface formed by the connecting ring being of arcuate contour to eliminate corners, and a plurality of ribs interior of the valve also connecting the side walls, said ribs being arranged to define a channel for conducting a cooling fluid through the valve and which progressively diminishes in cross section from inlet to outlet.

GORDON FOX.